United States Patent [19]
Bauer et al.

[11] 3,812,232
[45] May 21, 1974

[54] SOLVENT EXTRACTION PROCEDURE FOR SEPARATING SAMARIUM FROM NEODYMIUM

[75] Inventors: Donald J. Bauer; Roald E. Lindstrom, both of Reno; Lawrence E. Schultze, Sparks, all of Nev.

[73] Assignee: The United States of America as represented by the Secretary of the Interior, Washington, D.C.

[22] Filed: Aug. 15, 1972

[21] Appl. No.: 280,923

[52] U.S. Cl........... 423/21, 423/10, 423/263, 75/101 BE, 423/70, 423/54, 423/49, 423/139, 423/24, 423/100, 423/63, 423/22, 423/112, 423/87, 423/89
[51] Int. Cl. ........................................... C01f 17/00
[58] Field of Search ........... 423/21, 263; 75/101 BE

[56] References Cited
UNITED STATES PATENTS

| 3,146,063 | 8/1964 | Moore et al. | 423/21 |
| 3,323,857 | 6/1967 | Bauer et al. | 423/21 |
| 3,351,424 | 11/1967 | Bray et al. | 423/21 X |
| 3,615,171 | 10/1971 | Mason et al. | 423/21 |

Primary Examiner—Herbert T. Carter
Attorney, Agent, or Firm—William S. Brown

[57] ABSTRACT

Separation of mixtures of metals, particularly complex lanthanide mixtures, in aqueous solution is accomplished by means of a process comprising total extraction of metal values into an organic extractant, and subsequent selective stripping of one or more of the metal values into an aqueous phase.

3 Claims, No Drawings

SOLVENT EXTRACTION PROCEDURE FOR SEPARATING SAMARIUM FROM NEODYMIUM

Separation of the lanthanide elements, i.e., elements of atomic numbers 57 through 71, has conventionally been accomplished by means of ion exchange or solvent extraction techniques. Ion exchange is, however, limited by low throughput resulting from low diffusion coefficients.

As a result, greater reliance has been placed on solvent extraction, particularly systems employing acidic organophosphates as extractants. However, these systems have the disadvantage of forming cross-linked structures with metal ions, with resulting gellation, if the metal ion concentration in the organic phase becomes very high, usually as a result of equilibrium pH values greater than about 0.6. Higher pH values, however, generally give higher separation factors for metal extraction systems, particularly for separation of complex rare-earth mixtures because of the great chemical similarity of adjacent rare-earth elements.

It has now been found, according to the process of the invention, that the above disadvantages may be overcome by means of a two-step process comprising an initial total extraction of metal values into an acidic organic extractant, followed by selective stripping of individual metal values into an aqueous phase.

The process of the invention has been found to be particularly effective for separation of the metals of the lanthanide group. However, it may also be used for separation of the actinide elements, i.e., the elements of atomic numbers 89 through 103, as well as transition elements, i.e., elements of atomic numbers 21 through 30, 39 through 48 and 72 through 88. Of particular interest is the recovery, by the process of the invention, of samarium from mixtures of rare-earths because of the utility of samarium-cobalt alloys for super-magnets and hydrogen storage units. Current industrial processes for separation and purification of lanthanide elements result in production of substantial quantities of by-product mixtures of these elements consisting largely of samarium and neodymium, with lesser amounts of praseodymium, cerium and lanthanum. The process of the invention affords an efficient means for recovery of samarium from these elements and, particularly, separation from neodymium.

The initial feed material in the process of the invention consists of an aqueous solution of the elements to be separated. In particular, in the case of the above-mentioned by-product mixtures, the feed material will consist of an aqueous solution of samarium and neodymium in concentrations of about 5 to 90 percent, with the remaining elements present in concentrations of about 95 to 10 percent. Acid concentrations of this solution will usually range from about pH 5 to about 20 M, although optimum pH will vary somewhat with the concentration of metals in solution and the type and amount of organic extractant employed for the initial step of the process. The pH is not critical, provided it is high enough for essentially complete extraction of metal values. Any mineral acid or alkali hydroxide may be used for initial pH adjustment, if required.

The organic extractant consists of an organic phosphoric acid in a hydrocarbon diluent. The organic phosphoric acid is preferably a mono- or di-alkyl hydrogen phosphate, in which the alkyl radicals, either branched or straight chain, contain about four to 20 carbon atoms. Particularly preferred are mono- or di(2-ethylhexyl)phosphoric acid.

A preferred hydrocarbon diluent consists of a petroleum fraction comprising about 55 percent aromatics, 18 percent paraffins and 27 percent naphthenes. Such a fraction is available commercially under the trade name Socal 355L. Other suitable diluents include kerosine, toluene, xylene, petroleum ether and cyclohexane. Optimum concentration of phosphoric acid component in the organic extractant may vary considerably depending on the specific phosphoric acid component and diluent and the nature and concentration of the feed solution. However, concentrations of about 10 to 50 volume percent are usually satisfactory.

As discussed above, the organic extractant is used in an amount sufficient to substantially completely extract the metals from the aqueous feed solution. Furthermore, the amount of the extractant must be sufficient so that the resulting concentration of metals in the extractant is not sufficient to cause gellation. Generally, a metal concentration below about 45 grams per liter, preferably below 30 grams per liter, should be maintained in the organic phase. A phase ratio of organic extractant-to-feed solution of about 1:10 to 10:1 is generally satisfactory.

Initial extraction with the organic extractant, as well as the subsequent stripping operation, may be accomplished by means of either batch or continuous processes. It may be carried out as a batch process in conventional open containers equipped with suitable stirring devices and means, such as a drain opening, to permit separation of phases, such container serving as both mixer and settler cell. The organic phase may be retained in the cell for stripping. As a continuous process, commercially available countercurrent equipment including box type, cascade type or reciprocating plate type may be used. Initial extraction is readily carried out at room temperature and pressure, and with a contact time of about 15 seconds to 10 minutes.

Following the initial extraction, and separation of organic and aqueous phases, the metal values are preferentially recovered from the organic phase by stripping with an aqueous acid solution. Suitable acids include hydrochloric, nitric or sulfuric acid. The pH and phase ratio, i.e., the ratio of organic phase-to-aqueous phase, as well as contact time, are interrelated, with optimum values of these variables depending on the metal or metals to be stripped from the organic phase. Generally, however, a pH of about zero to 4.0, preferably about 0.2 to 1.5, and a phase ratio of about 10:1 to 1:10, preferably about 2:1 to 1:2, and a contact time of about 1 to 5 minutes, are satisfactory, particularly for separation of Sm (in organic phase) from Nd. When using multistage equipment, it is frequently desirable to maintain a phase ratio close to 1:1, and this will usually indicate the use of a pH in the range of about 0.2 to 0.7.

Metals remaining in the organic phase are then stripped with acid solution at a concentration of about 8N to 1N and a phase ratio of about 5:1 to 1:5. For recovery of lanthanides, particularly samarium, from the organic phase, stripping with 6 N HCl is preferred.

Metal values are then recovered from the strip solutions by conventional means. E.g., lanthanides may be precipitated from the aqueous phase at a pH of about 3 with oxalic acid. The oxalates are then ignited at about 1,000°C to produce oxides, from which the metals may be obtained by conventional processes such as metallothermic chlorination-reduction or fused salt electrolysis.

It has also been found that the addition of a salt such as ammonium chloride, ammonium nitrate, or ammonium sulfate to the aqueous stripping solution results in substantially more rapid phase-disengagement of the aqueous and organic phases, thus improving the efficiency of the stripping process. In addition, separation factors for the metal values are thereby improved. Concentrations of the salt in the stripping solution of about 10 g/l to 400 g/l, preferably about 100 g/l to 200 g/l, have been found to give good results.

The invention will be further illustrated by the following example.

EXAMPLE

A feed solution was prepared by dissolving rare earth oxides in a 10 percent solution of hydrochloric acid. The resulting solution had a pH of 3 and contained the following rare-earth distribution:

|  | Analysis, percent |
|---|---|
| $La_2O_3$ | 2.3 |
| $CeO_2$ | 2.9 |
| $Pr_6O_{11}$ | 5.1 |
| $Nd_2O_3$ | 29.8 |
| $Sm_2O_3$ | 60.0 |

4 liters of this feed solution was contacted with 20 liters of an organic extractant consisting of 50 percent di(2-ethylhexyl)phosphoric acid in Socal 355L diluent. The organic phase was thus loaded with 29 grams per liter of rare earths (oxide basis).

The aqueous and organic phases were separated by drawing off the aqueous phase and the organic phase was contacted with an equal volume of an aqueous hydrochloric acid stripping solution containing 200 grams per liter of $NH_4Cl$ and having an equilibrium pH of 0.42. Aqueous and organic phases were again separated by drawing off the aqueous phase and lanthanides were precipitated from the aqueous phase at pH 3 with oxalic acid.

Lanthanides remaining in the stripped organic phase were then stripped with 6 N HCl and precipitated at pH 3 with oxalic acid. The resulting oxalates were ignited to oxides at 1,000°C, weighed and analyzed by X-ray fluorescence. The resulting Nd/Sm separation factor, i.e., the ratio of the distribution coefficients of Nd and Sm in the organic and aqueous phases, was approximately 10. Slight variation in either the phase ratio or pH during stripping was found to have little effect on the Nd/Sm separation factor.

We claim:

1. A method for separation of samarium from neodymium in aqueous feed solution consisting essentially of (1) contacting the feed solution with an organic extractant consisting essentially of an organic phosphoric acid in a hydrocarbon diluent in an amount and for a time sufficient to substantially completely extract all metal values into the organic phase and to prevent gellation, (2) separating the aqueous and organic phases, and (3) contacting the resulting loaded organic phase with a stripping solution consisting essentially of an aqueous solution of hydrochloric, nitric or sulfuric acid having a pH of about 0.2 to 1.5 to selectively strip neodynium from the organic phase.

2. The method of claim 1 in which the organic phosphoric acid is di(2-ethylhexyl)phosphoric acid.

3. The method of claim 1 in which the stripping solution additionally contains about 100 to 200 grams per liter of ammonium chloride, ammonium nitrate or ammonium sulfate.

* * * * *